United States Patent
N et al.

(10) Patent No.: US 11,196,242 B1
(45) Date of Patent: Dec. 7, 2021

(54) CIRCUIT INTERRUPTER FOR INTERRUPTING AN ELECTRIC CURRENT DURING FAULT CONDITIONS

(71) Applicant: ABB Schweiz AG, Baden (CH)

(72) Inventors: Chandrashekar N, Andhra Pradesh (IN); Raghava Kambham, Telangana (IN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/887,462

(22) Filed: May 29, 2020

(51) Int. Cl.
*H02H 3/04* (2006.01)
*H02H 1/00* (2006.01)

(52) U.S. Cl.
CPC ............ *H02H 3/04* (2013.01); *H02H 1/0007* (2013.01)

(58) Field of Classification Search
CPC ............................... H02H 3/04; H02H 1/0007
USPC .......................................................... 361/115
See application file for complete search history.

(56) References Cited

U.S. PATENT DOCUMENTS

| | | | | |
|---|---|---|---|---|
| 3,735,215 A * | 5/1973 | Conrad | ................. | H01F 7/1872 361/86 |
| 5,757,598 A * | 5/1998 | Aromin | ................. | H01H 47/04 361/42 |
| 6,052,266 A * | 4/2000 | Aromin | ................. | H01H 47/04 361/42 |
| 2014/0278157 A1* | 9/2014 | Simonin | ................ | H02H 3/335 702/58 |

FOREIGN PATENT DOCUMENTS

WO    WO-9724790 A1 *    7/1997    ............... H02H 3/33

* cited by examiner

*Primary Examiner* — Jared Fureman
*Assistant Examiner* — Nicolas Bellido
(74) *Attorney, Agent, or Firm* — Leydig, Voit & Mayer, Ltd.

(57) ABSTRACT

A circuit interrupter for interrupting an electric current in an electrical line is disclosed. The circuit interrupter includes an electronic circuit for monitoring and detecting a breaker fault condition. The electronic circuit is connected to a semiconductor switch for energizing a solenoid to trip a circuit breaker. A winding of the solenoid is energized to trip the circuit breaker. The solenoid is configured to have a center tap in the winding, such that there are two parts in the winding separated by the center tap. Further, upon detection of an open circuit condition in a part of the winding, the electronic circuit is configured to provide a trip signal to the circuit breaker using the other part of the winding.

8 Claims, 7 Drawing Sheets

CIRCUIT INTERRUPTER FOR INTERRUPTING AN ELECTRIC CURRENT DURING FAULT CONDITIONS

TECHNICAL FIELD

This disclosure relates to ground fault circuit interrupters and, more particularly, a circuit interrupter for interrupting an electric current in an electrical line connecting an electrical supply to a load on detection of a fault condition by the circuit interrupter.

BACKGROUND

Fault interrupting devices are designed to trip in response to detection of a fault condition in an electric circuit. Ground fault circuit interrupters (GFCIs) are a type of electronic circuit breaker that may be used in some electrical systems to protect the electrical circuit from ground faults. The ground fault occurs when a person comes into contact with a hot conductor and an earth ground, a situation which can result in serious injury. The GFCI detects this fault by detecting a current imbalance between a power (or hot) conductor and a neutral conductor of the electrical circuit. Upon detection of the ground fault, a trip circuit within the GFCI may be activated to interrupt or disconnect power (i.e., current flow) from an electrical power source to the electrical circuit.

In general, the GFCI follow the standard set up by a guarantor laboratory (Underwriter's Laboratory (UL)). The UL standard containing the GFCI is UL-943, which is called 'safety standard-ground fault circuit interrupter'. The UL-943 is applicable to Class A, single and three-phase, ground-fault circuit-interrupters intended for protection of personnel. The UL-943 comprises minimum requirements for function, construction, performance, and markings for the above types of the GFCI. In certain scenarios, the GFCI may not respond upon detection of the ground faults. For example, when a solenoid that activates mechanical trip action is open circuited or when a SCR that activates the solenoid is open circuited, the GFCI doesn't trip to disconnect or interrupt the power. In such cases, the GFCI may not be able to ensure protection against the ground fault.

According to the UL 943, when the GFCI is unable to provide the ground fault or grounded-neutral fault protection, a visual or audible indication is sufficient and doesn't require tripping for the interruption of the power. However, in practice, the GFCI should provide the protection even in the aforesaid cases by tripping. In view of above issues, the UL-943 standard is considering to include a mandate of the power interruption for the cases in which GFCI is unable to provide the ground fault or grounded-neutral fault protection.

Therefore, it is desired to develop a system that provides protection, even when the GFCI is unable to provide the ground fault or grounded-neutral fault protection, by tripping the GFCI.

SUMMARY

It is an object of some embodiments to trip a circuit breaker when the circuit breaker is unable to provide a ground fault or grounded-neutral fault protection. Some embodiments are based on a recognition that the circuit breaker is unable to provide a ground fault or grounded-neutral fault protection when a solenoid that activates a mechanical trip action of the circuit breaker is open and/or silicon controlled rectifier (SCR) that activates the solenoid is open. To that end, some embodiments use a center-tapped solenoid to trip the circuit breaker when the solenoid or the SCR is open circuited.

Accordingly, embodiments disclosed herein provide a circuit interrupter for interrupting an electric current in an electrical line connecting an electrical supply to a load on detection of a breaker fault condition by the circuit interrupter, the circuit interrupter having an electronic circuit for monitoring and detecting the breaker fault condition, the electronic circuit being connected to a semiconductor switch for energizing a solenoid to trip a circuit breaker, wherein a winding of the solenoid is energized to trip the circuit breaker, and wherein the solenoid is configured to have a center tap in the winding, such that there are two parts in the winding separated by the center tap; and wherein on detection of an open circuit condition in a part of the winding, the electronic circuit is configured to provide a trip signal to the circuit breaker using the other part of the winding.

According to an embodiment, the breaker fault condition corresponds to one or more of the open circuit condition in one of the parts of the winding of the solenoid or an open circuit condition in a silicon controlled rectifier (SCR) that activates the solenoid.

According to an embodiment, the electronic circuit detects the breaker fault condition based on a number of LED blinks indicating the open circuit condition in one of the parts of the winding or the open circuit condition in the SCR.

According to another embodiment, the electronic circuit detects the breaker fault condition based on a pattern of LED blinks indicating the open circuit condition in one of the parts of the winding or the open circuit condition in the SCR.

According to some embodiments, the number of LED blinks and the pattern of LED blinks are generated by an Application Specific Integrated Circuit (ASIC) operatively connected to the electronic circuit.

According to some embodiments, the electronic circuit is connected to an opto-coupler, and wherein the opto-coupler is configured to detect the open circuit condition in the part of the winding based on a voltage difference between an end of the part of the winding and the center tap, and trigger the electronic circuit to provide the trip signal to the circuit breaker using the other part of the winding.

According to some embodiments, the electronic circuit generates the trip signal at the end of a second pulse that corresponds to a second LED blink in the number of LED blinks.

According to some embodiments, the electronic circuit generates the trip signal at the end of a second pulse that corresponds to a second LED blink in the pattern of LED blinks.

Therefore, even when the part of winding of the solenoid is open circuited, the other half of the solenoid is still intact and trip current flows in the intact half and through the center tap, resulting in tripping of the circuit breaker. As tripping interrupts the power flow, reliable power and protection of load/electric circuit is also ensured.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION OF THE DRAWINGS

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
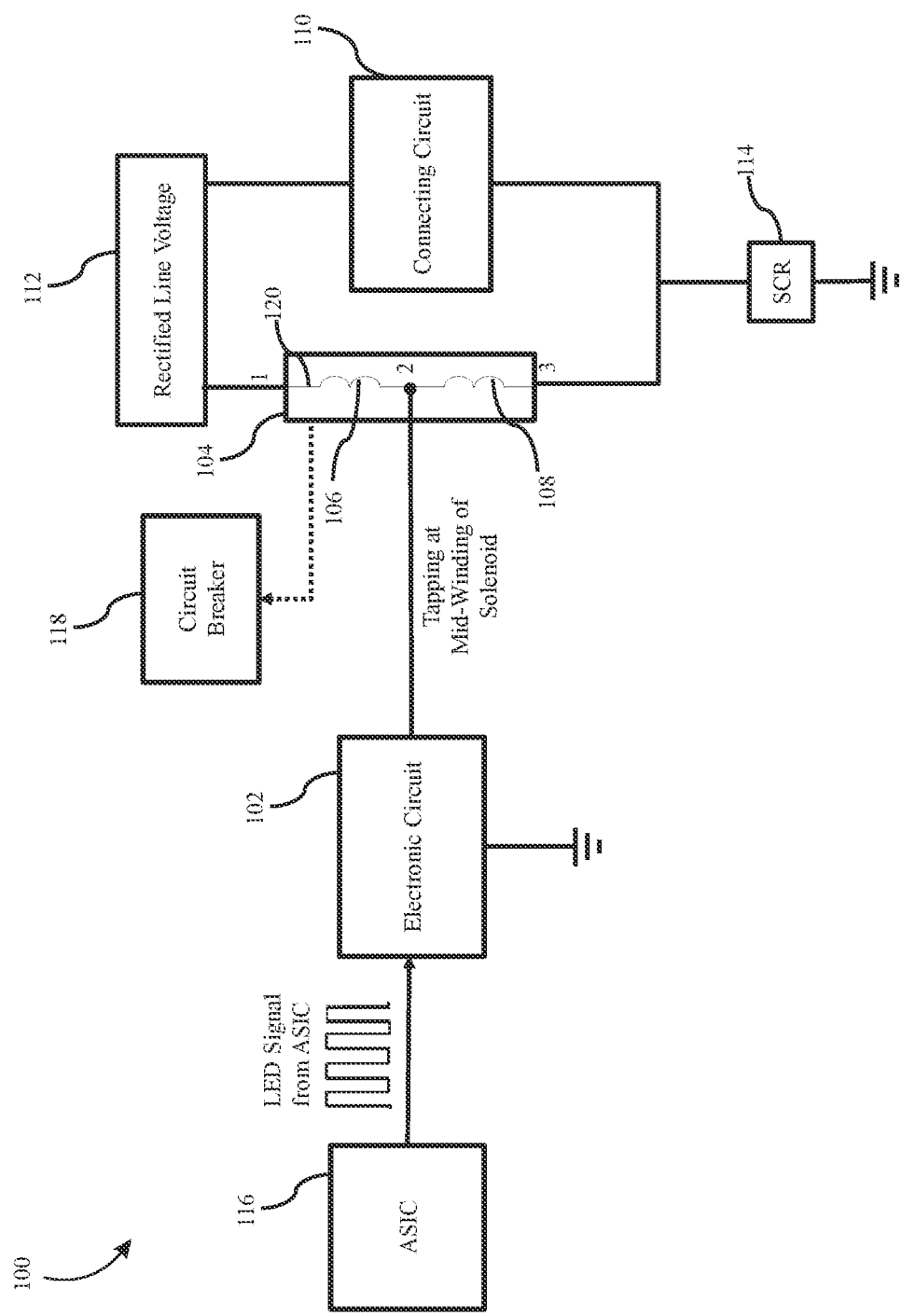
FIG. 1 shows a block diagram of a circuit interrupter for interrupting an electric current in an electrical line, according to some embodiments.

FIG. 1 shows a block diagram of a circuit interrupter 100 for interrupting an electric current in an electrical line, according to some embodiments. The circuit interrupter 100 comprises an electronic circuit 102, a center-tapped solenoid 104, a connecting circuit 110, a silicon controlled rectifier (SCR) 114, and an Application Specific Integrated Circuit (ASIC) 116. A solenoid is a coil of wire usually in cylindrical form (e.g., a winding 120) that when carrying current acts like a magnet so that a movable core is drawn into the coil when the current flows. In some embodiments, the solenoid is used as a switch or activates a mechanical trip action. The center-tapped solenoid 104 is formed by tapping the winding 120 of the solenoid at its center. As a result of the center-tapping, the center-tapped solenoid 104 includes two parts, namely, an upper half 106 and a lower half 108.

Further, the center-tapped solenoid 104 may include three ends represented by 1, 2, and 3, respectively. The end 2 refers to a point of the winding 120 at which the solenoid is center-tapped. The end 1 is connected to an output line of a rectifier unit providing rectified output. According to some embodiments, the rectifier unit is a full bridge rectifier outputting full wave rectified voltage 112 from lines that are connected to an electric supply which is configured to supply electrical energy to a load. The load may be resistive load, inductive load, capacitive load, or combination thereof. In some embodiments, the lines correspond to a hot conductor and a neutral of an electric circuit. Rating of the electric supply ranges from voltage on the order of a few volts to voltage on the order of kV. For example, the rating of the electric supply may be alternating current (AC) 120 V 60 Hz, or to 240 V 50 Hz. The end 3 is connected to the rectified line voltage 112 via the connecting circuit 110. The SCR 114 is configured to activate the center-tapped solenoid 104. The winding 120 of the center-tapped solenoid 104 between the end 1 and the end 2 corresponds to the upper half 106. Likewise, the winding 120 of the center-tapped solenoid 104 between the end 2 and the end 3 corresponds to the lower half 108. Hereinafter, the 'center-tapped solenoid' and 'solenoid' are used interchangeably and would mean the same.

The electronic circuit 102 is electrically connected to a semiconductor switch 114 (such as, but not limited to, silicon controlled rectifier (e.g., SCR 114), bipolar junction transistor, field effect transistor and any gate controlled device) for energizing the solenoid 104 to trip a circuit breaker 118 on detection of a breaker fault condition. In an alternate embodiment, the semiconductor switch is embedded in the electronic circuit 102. The breaker fault condition corresponds an open circuit condition in the upper half 106 or the lower half 108 of the solenoid 104. Additionally, the breaker condition corresponds to an open circuit condition in the SCR 114. In some embodiments, the breaker fault condition corresponds to an open circuit condition in both the SCR 114 and one of the parts of the solenoid 104.

In some embodiments, the electronic circuit 102 is connected to the Application Specific Integrated Circuit (ASIC) 116. The ASIC 116 turns ON a light-emitting diode (LED) once at power-up and holds the LED in ON state during normal operation. The ASIC 116 turns the LED ON and OFF alternatively for a number of times during the breaker fault conditions (the SCR or solenoid or both are open). Such alternative turning ON and OFF of the LED is referred to as blinking. Additionally, the ASIC 116 blinks the LED continuously during Self-Test failure conditions including SCR open. The ASIC 116 blinks the LED continuously at a certain rate, for example, 250 mSec ON/OFF time. In an alternate embodiment, the ASIC 116 blinks the LED in a pattern during the breaker fault conditions. The blinking pattern of the LED corresponds to the LED blinking at irregular intervals. For example, 300 mSec ON/OFF time for first LED blink and 500 mSec ON/OFF time for second LED blink. To that end, the blinking of the LED can be contemplated as an indication of occurrence of the breaker fault condition. In particular, according to an embodiment, a second pulse in the LED signal from the ASIC 116 is considered as indication of the breaker fault condition and, subsequently, the electronic circuit 102 generates a trip signal at the end of the second pulse. The electronic circuit 102 is configured to issue the generated trip signal to the semiconductor switch 114. The generated trip signal is passed through the center tap of the solenoid 104. In an alternate embodiment, the ASIC 116 is integrated within the electronic circuit 102. In such embodiment, the electronic circuit 102 performs the detection of the breaker fault condition as described above. In some embodiments, both the SCR 114 and the electronic circuit 102 are grounded. In an embodiment, the connecting circuit 110 is an opto-coupler. In an alternate embodiment, the connecting circuit 110 is a SCR-based circuit. The connecting circuit 110 is configured to connect the end 3 of the center-tapped solenoid 104 with the rectified line voltage 112.

Figure 2A:
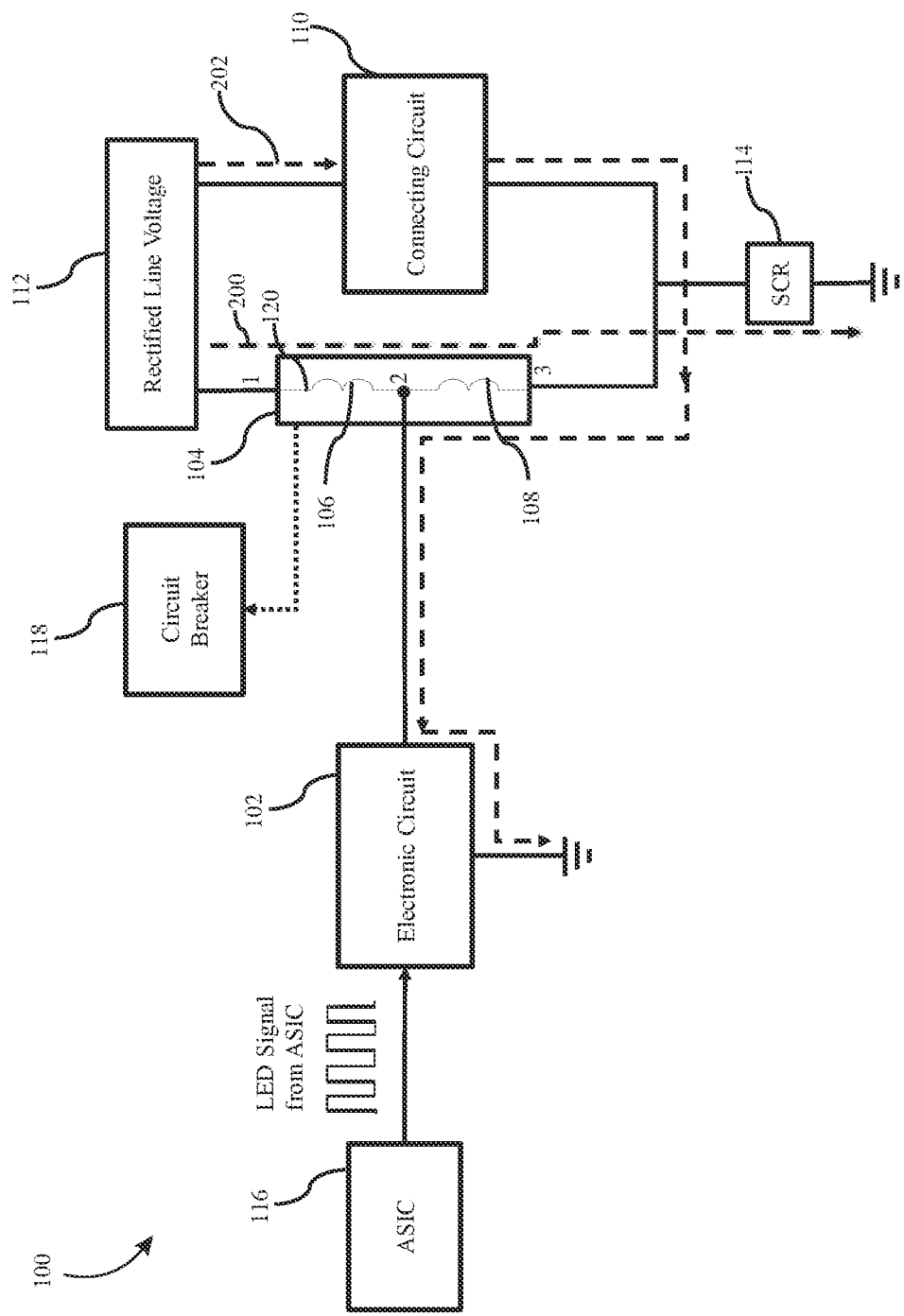
FIG. 2A shows a block diagram of the circuit interrupter and direction of a trip current flow when an upper-half of a solenoid is open, according to some embodiments.

FIG. 2A shows a block diagram of the circuit interrupter 100 and the direction of a trip current flow when the upper-half 106 of the solenoid 104 is open, according to some embodiments. In normal tripping of the circuit breaker 118, the SCR 114 activates the solenoid 104 to initiate the mechanical trip action and the trip current flows through the rectified line voltage 112, the upper half 106, the lower half 108, the SCR 114, ground and neutral (as shown by dash line 200).

However, the breaker fault conditions may occur in a manner in which the circuit breaker 118 may not trip to provide protection to a device or the electric circuit. For example, the solenoid 104 may be open circuited due to a cut in the solenoid winding 120, in such condition the solenoid 104 cannot be activated to trip the circuit breaker 118. Therefore, when the solenoid 104 is open circuited, the solenoid 104 remains in inactivate state and, hence, the circuit breaker 118 doesn't trip. An open condition of the SCR 114 also corresponds to the breaker fault condition in which the circuit breaker 118 doesn't trip. To that end, some embodiments are based on objective of tripping the circuit breaker 118 when the solenoid 104 or the SCR 114 is open circuited.

In some embodiments, the center-tapped solenoid 104 is utilized to trip the circuit breaker 118 when the solenoid 104 or the SCR 114 is open circuited. Here, the connecting circuit 110 is the SCR-based circuit. Consider the upper half 106 of the solenoid 104 is open circuited. The ASIC 116 detects the open condition in the upper half 106 and the LED blinks. The LED blink is utilized as indication of detection of the breaker fault condition. The LED blink triggers the electronic circuit 102. In particular, the electronic circuit 102 generates the trip signal at the second LED glow (i.e. at the end of the second pulse) to trip the circuit breaker 118. The connecting circuit 110 connects the end 3 of the center-tapped solenoid 104 with the rectified line voltage 112. As a result, the trip current flows through the rectified line voltage 112, the connecting circuit 110, the lower half 108, the electronic circuit 102, the ground and the neutral. The direction of flow of the trip current in this case is shown by dash line 202 in the FIG. 2A. Therefore, even when the upper half 106 of the solenoid 104 is open, the other part i.e. the lower half 108 of the solenoid 104 is still intact and the trip current flows in the lower half 108 and through the center tap (end 3-end 2), resulting in tripping of the circuit breaker 118.

Figure 2B:
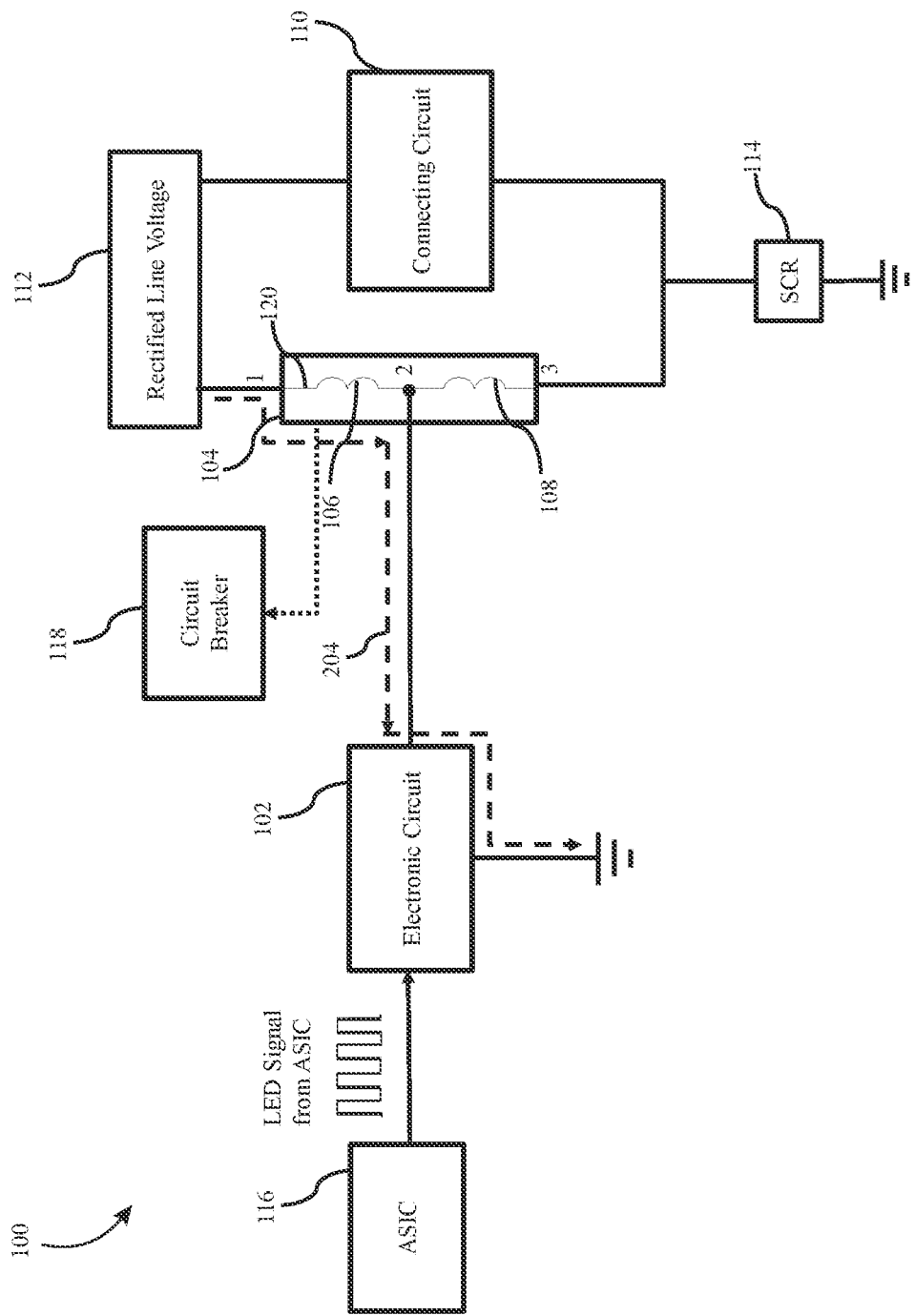
FIG. 2B shows a block diagram of the circuit interrupter and direction of a trip current flow when a lower half of the solenoid is open, according to some embodiments.

FIG. 2B shows a block diagram of the circuit interrupter 100 and direction of a trip current flow when the lower half 108 of the solenoid 104 is open, according to some embodiments. Consider the lower half 108 of the solenoid 104 is open circuited. The ASIC 116 detects the open condition in the lower half 108 and the LED blinks. The LED blink is utilized as indication of detection of the breaker fault condition. The LED blink triggers the electronic circuit 102. In particular, the electronic circuit 102 generates the trip signal at the second LED glow to trip the circuit breaker 118.

The trip current flows through the rectified line voltage 112, the upper half 106, the electronic circuit 102, the ground and the neutral. The direction of flow of the trip current in this case is shown by dash line 204 in the FIG. 2B. Thereby, the trip current flows in the other part of the solenoid 104 i.e. the upper half 106 and through the center tap, resulting in tripping of the circuit breaker 118. Therefore, in the open circuited solenoid (open upper half/open lower half), one half of the solenoid 104 is still intact and can be used to trip the circuit breaker 118. Thereby, providing protection by tripping the circuit breaker 118 during the breaker fault conditions. Likewise, in the open SCR condition, the center-tapped solenoid 104 can be used to trip the circuit breaker 118.

Figure 3A:
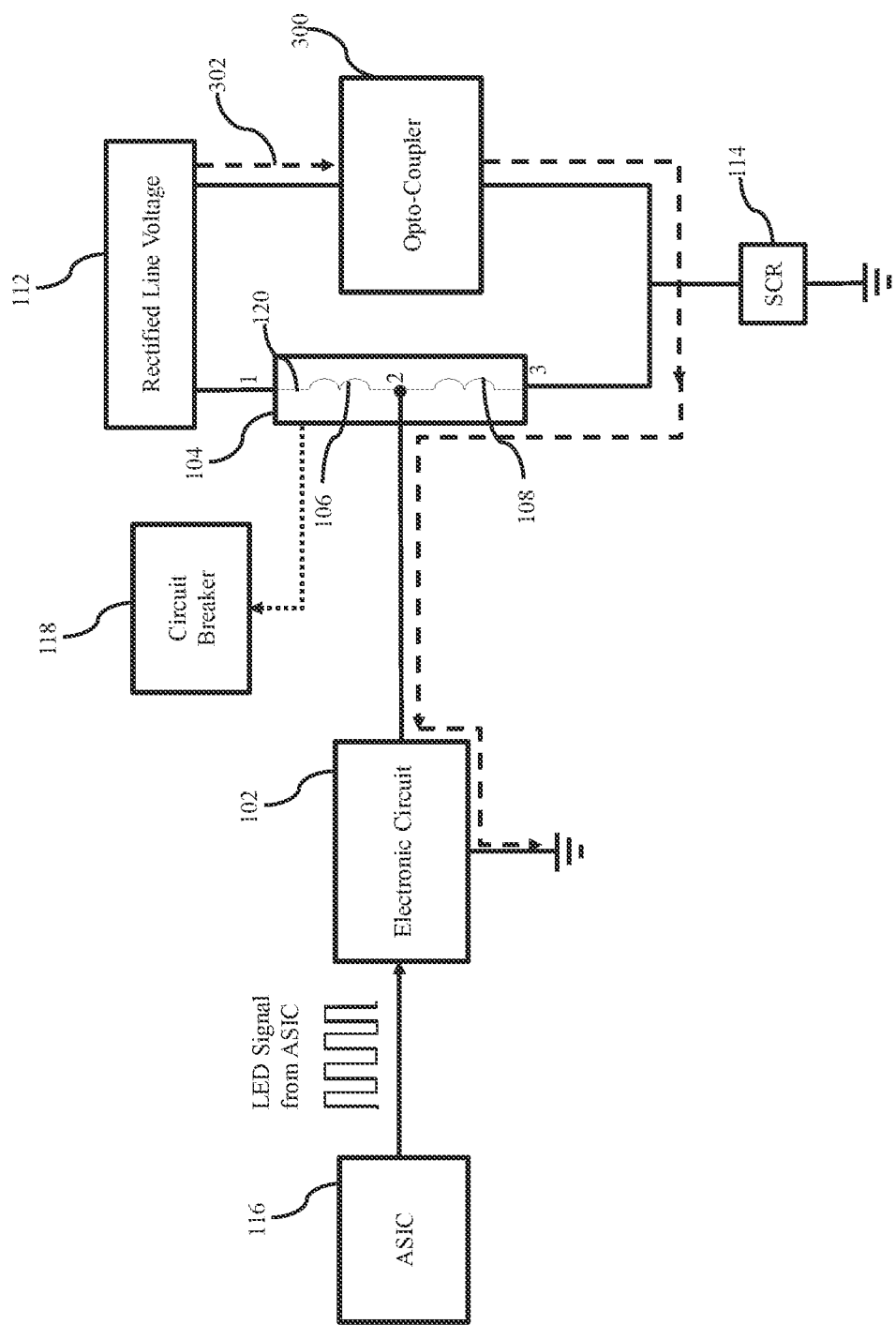
FIG. 3A shows a block diagram of the circuit interrupter, in which a connecting circuit is an opto-coupler, for tripping the circuit breaker when the upper half of the solenoid is open, according to some embodiments.

FIG. 3A shows a block diagram of the circuit interrupter, in which the connecting circuit is an opto-coupler 300, for tripping the circuit breaker 118 when the upper half 106 of the solenoid 104 is open, according to some embodiments. Here, instead of the SCR-based circuit (as used in FIGS. 2A & 2B), the opto-coupler 300 is used as the connecting circuit and is configured to connect the end 3 of the center-tapped solenoid 104 with the rectified line voltage 112. The opto-coupler 300 is triggered based on a voltage difference between top end (end 1) of the solenoid 104 and the center-tapping (end 2) of the solenoid 104. If the upper half 106 of the solenoid 104 is intact (i.e. no open circuit in the upper half 106), then the voltage difference between the top-end and the center-tapping of the solenoid 104 is much less and is insufficient to trigger the opto-coupler 300.

Consider the upper half 106 of the solenoid 104 is open circuited. In such case, the voltage difference exists between the top-end and the center-tapping of the solenoid 104, which is adequate to trigger the opto-coupler 300. Thereby, such voltage difference triggers the opto-coupler 300 and the opto-coupler 300 connects the rectified line voltage 112 to end 3 of the solenoid 104. The LED blinks and results in triggering of the electronic circuit 102. In particular, the electronic circuit 102 generates the trip signal at the second LED glow to trip the circuit breaker 118. As the opto-coupler connects the end 3 of the center-tapped solenoid 104 with the rectified line voltage 112, the trip current flows through the rectified line voltage 112, the opto-coupler 300, the lower half 108, the electronic circuit 102, the ground and the neutral. The direction of flow of the trip current in this case is shown by dash line 302 in the FIG. 3A. Therefore, when the upper half 106 is open, the other part i.e. the lower half 108 of the solenoid 104 is still intact and the trip current flows in the lower half 108 and through the center tap (end 3-end 2), resulting in tripping of the circuit breaker 118.

Figure 3B:
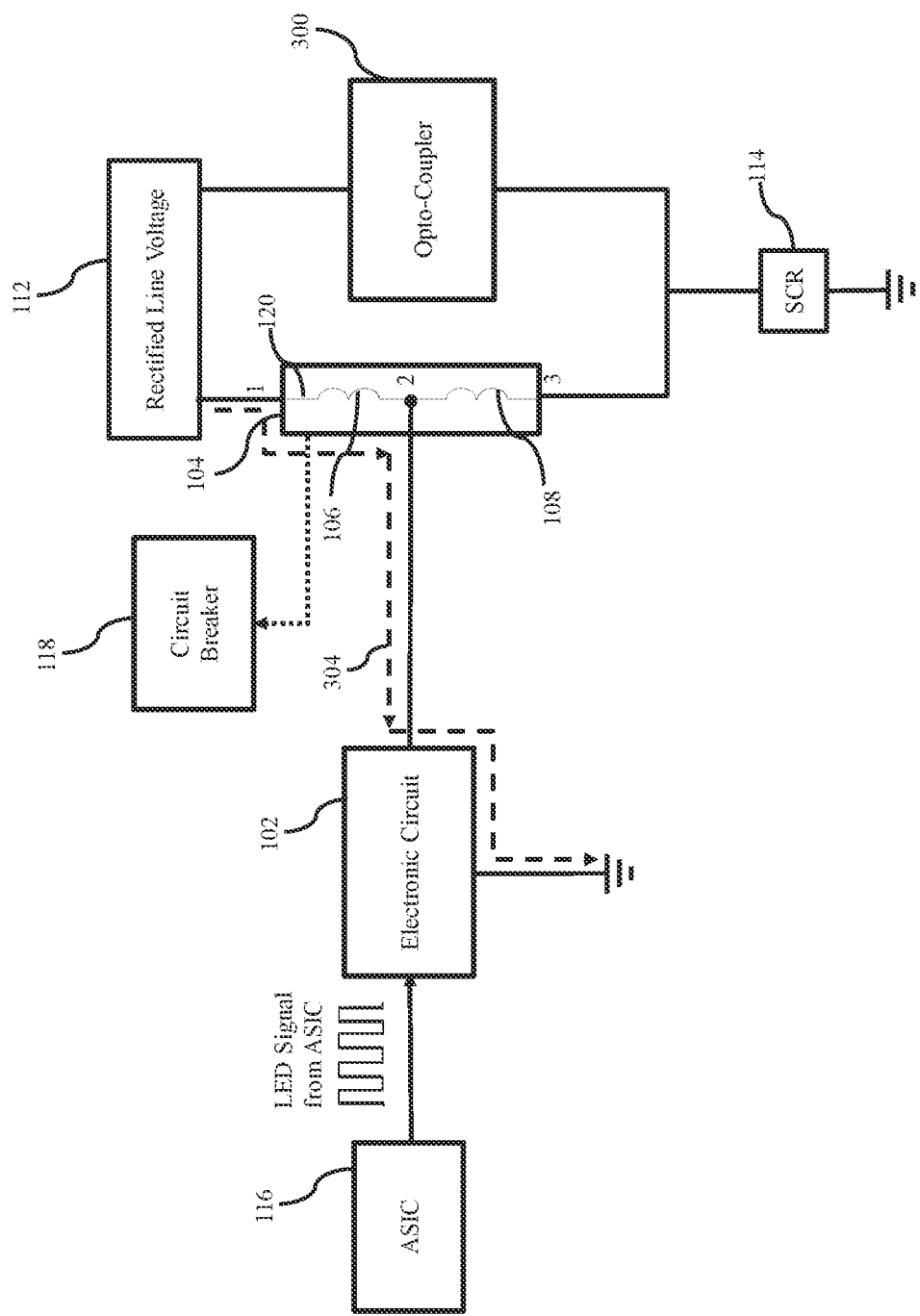
FIG. 3B shows a block diagram of the circuit interrupter, in which the connecting circuit is the opto-coupler, for tripping the circuit breaker when the lower half of the solenoid is open, according to some embodiments.

FIG. 3B shows a block diagram of the circuit interrupter, in which the connecting circuit is the opto-coupler 300, for tripping the circuit breaker 118 when the lower half 108 of the solenoid 104 is open, according to some embodiments. Consider the lower half 108 of the solenoid 104 is open. Since the other part of the solenoid 104 (i.e. the upper half 106 of the solenoid 104) is intact, due to which the voltage difference between top-end and center-tapping of the solenoid 104 is much less, the opto-coupler 300 is not triggered. The ASIC 116 detects the open condition in the lower half 108 and the LED blinks. The LED blink triggers the electronic circuit 102. In particular, the electronic circuit 102 generates the trip signal at the second LED glow to trip the circuit breaker 118.

The trip current flows through the rectified line voltage 112, the upper half 106, the electronic circuit 102, the ground and the neutral. The direction of flow of the trip current in this case is shown by dash line 304 in the FIG. 3B. Thereby, the trip current flows in the other part of the solenoid 104 (i.e., the upper half 106) and through the center tap, resulting in tripping of the circuit breaker 118. Therefore, even when the solenoid 104 is open circuited (open upper half/open lower half), one half of the solenoid 104 is still intact and the trip current flows in the intact half and through the center tap, resulting in tripping of the circuit breaker 118.

Figure 4A:
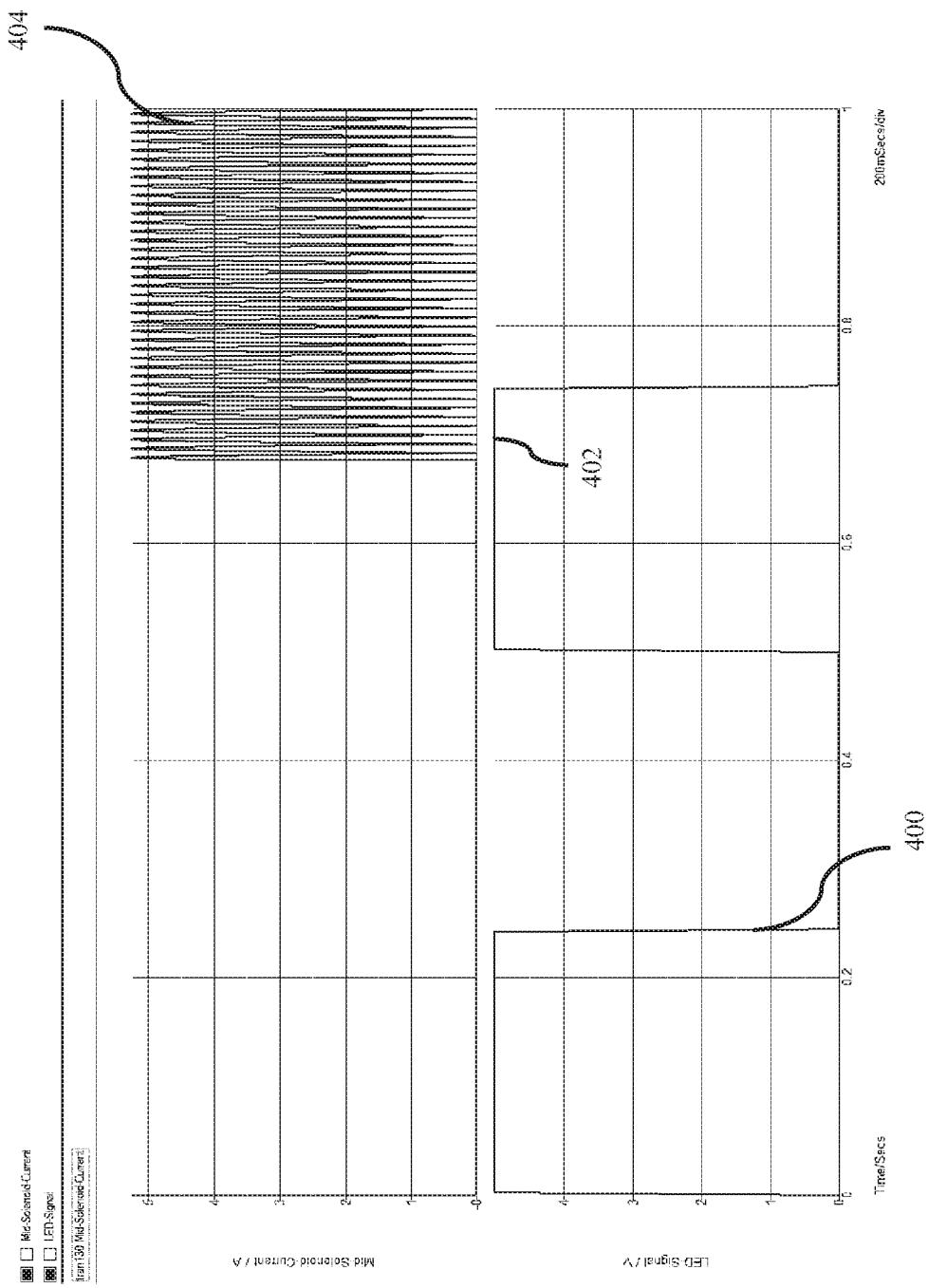
FIG. 4A shows simulation results depicting a current flow in case of open circuited lower half of the solenoid, according to some embodiments.

FIG. 4A shows simulation results depicting a current flow in case of open circuited lower half 108 of the solenoid 104, according to some embodiments. Line 400 represents LED signal from the ASIC 116. The LED signal includes pulses that represent the blinking of the LED which in turn indicates the detection of the breaker fault condition. Line 404 represents current from the center-tapping of solenoid 104 through the electronic circuit 102, which is referred to as 'mid-solenoid current' in the simulation results. It is evident from the simulation results in the FIG. 4A that when the lower-half 108 of the solenoid 104 is open circuited, the electronic circuit 102 is triggered at the end of second pulse 402 and the mid-solenoid current 404 flows through the center tap. In other words, the current flows through the rectified line voltage 112, the center-tapping and to the ground via the electronic circuit 102, resulting in a trip action of the circuit breaker 118.

Figure 4B:
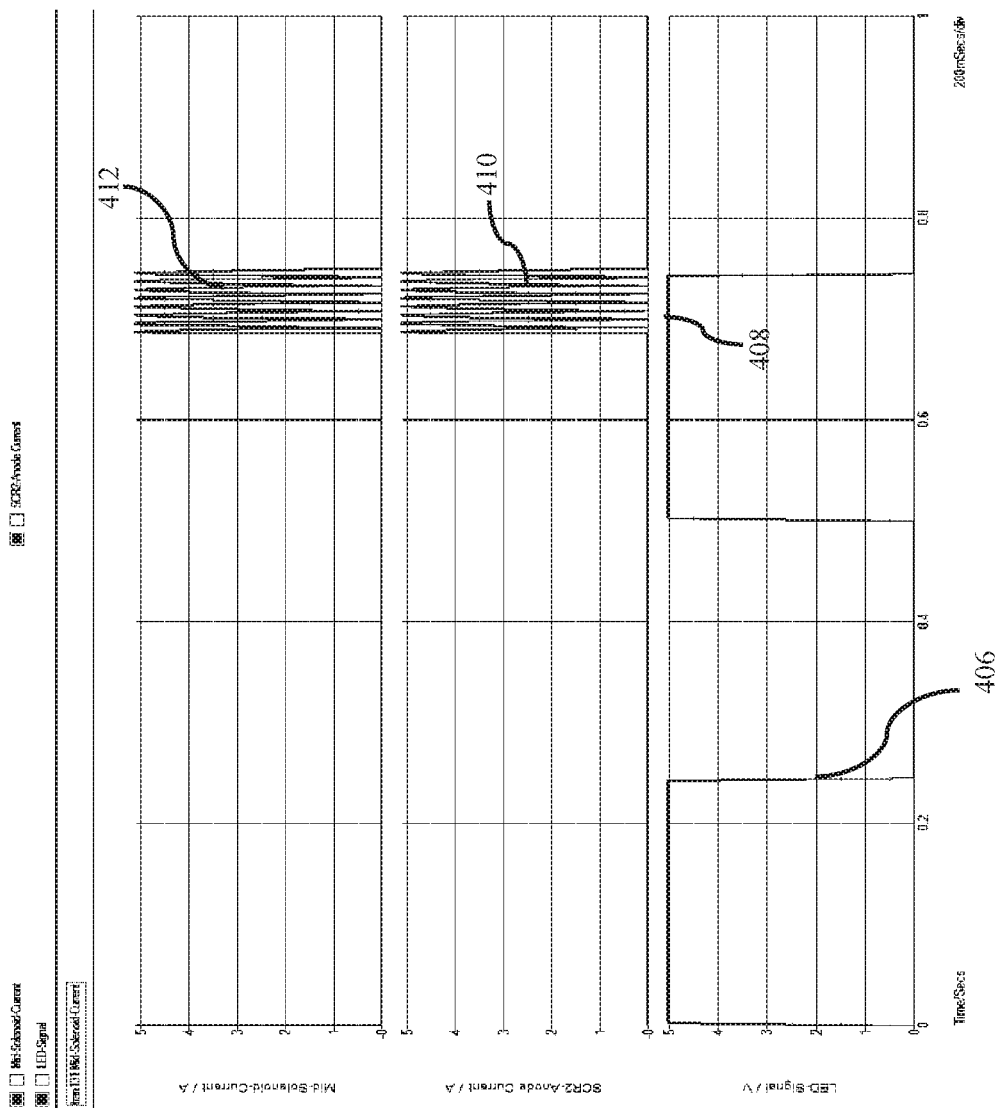
FIG. 4B shows simulation results depicting a current flow in case of open circuited upper half of the solenoid, according to some embodiments.

FIG. 4B shows simulation results depicting a current flow in case of open circuited upper half 106 of the solenoid 104, according to some embodiments. Line 406 represents the LED signal from the ASIC 116 and 410 represents a current through the connecting circuit 110, which is referred to as 'SCR2-Anode current' in the simulation results. Line 412 represent the mid-solenoid current.

It is evident from the simulation results in the FIG. 4B that when the upper half 106 of the solenoid 104 is open circuited, at the end of the second pulse 408, the current 410 flows through the connecting circuit 110 and the mid-solenoid current 404 flows through the center tap. In particular, the current flows through the rectified line voltage 112, the connecting circuit 110, the lower half 108, the center-tapping and to the ground via the electronic circuit, resulting in the trip action. Therefore, from the simulation results (FIGS. 4A & 4B), it can be concluded that when either of the lower half 106 or the upper half 108 of the solenoid 104 is open, then a current through the center-tapping represents that the current is flowing through the other connected half of the solenoid 104. This current through the connected half of the solenoid 104 results in the trip action.

Therefore, the circuit interrupter 100 can be used to detect the breaker fault conditions and trip the circuit breaker 118. As tripping interrupts the power flow, reliable power and protection of load/electric circuit is ensured. Also, as only single solenoid (104) is used for tripping the breaker, no backup or redundant component is introduced or required. In the circuit interrupter 100, the LED glowing is taken as a reference for triggering the electronic circuit 102 and/or one half of the solenoid (106/108). Since multiple LED blinks or blinking patterns indicate various kinds of fault conditions, therefore, the circuit interrupter 100 can respond to various breaker fault conditions where the LED blinks more than once.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A circuit interrupter for interrupting an electric current on detection of a breaker fault condition by the circuit interrupter, the circuit interrupter having an electronic circuit for monitoring and detecting the breaker fault condition, the electronic circuit being connected to a semiconductor switch for energizing a solenoid to trip a circuit breaker, wherein a winding of the solenoid is energized to trip the circuit breaker, wherein the solenoid is configured to have a center tap in the winding, such that there are two parts in the winding separated by the center tap, and wherein on detection of an open circuit condition in a part of the winding, the electronic circuit is configured to provide a trip signal to the circuit breaker using the other part of the winding.

2. The circuit interrupter of claim 1, wherein the breaker fault condition corresponds to one or more of the open circuit condition in one of the parts of the winding of the solenoid or an open circuit condition in a silicon controlled rectifier (SCR) connected to the solenoid.

3. The circuit interrupter of claim 2, wherein the electronic circuit is configured to detect the breaker fault condition based on a number of light-emitting diode (LED) blinks indicating the open circuit condition in one of the parts of the winding or the open circuit condition in the SCR.

4. The circuit interrupter of claim 3, wherein the electronic circuit is configured to generate the trip signal at an end of a second pulse that corresponds to a second LED blink in the number of LED blinks.

5. The circuit interrupter of claim 2, wherein the electronic circuit is configured to detect the breaker fault condition based on a pattern of LED blinks indicating the open circuit condition in one of the parts of the winding or the open circuit condition in the SCR.

6. The circuit interrupter of claim 5, wherein the pattern of LED blinks is generated by an Application Specific Integrated Circuit (ASIC) operatively connected to the electronic circuit.

7. The circuit interrupter of claim 5, wherein the electronic circuit is configured to generate the trip signal at an end of a second pulse that corresponds to a second LED blink in the pattern of LED blinks.

8. The circuit interrupter of claim 1, wherein the electronic circuit is connected to an opto-coupler, and wherein the opto-coupler is configured to:
   detect the open circuit condition in the part of the winding based on a voltage difference between an end of the part of the winding and the center tap; and
   trigger the electronic circuit to provide the trip signal to the circuit breaker using the other part of the winding.

* * * * *